(12) United States Patent
Katayama et al.

(10) Patent No.: US 11,552,938 B2
(45) Date of Patent: Jan. 10, 2023

(54) DEVICE AND METHOD FOR MEDIATING CONFIGURATION OF AUTHENTICATION INFORMATION

(71) Applicant: SORACOM, INC., Setagaya-ku (JP)

(72) Inventors: Akio Katayama, Tokyo (JP); Kengo Sakai, Tokyo (JP); Georges Olivier Comarmond, Beau Bassin (MU)

(73) Assignee: SORACOM, INC., Tokyo (JP)

( * ) Notice: Subject to any disclaimer, the term of this patent is extended or adjusted under 35 U.S.C. 154(b) by 23 days.

(21) Appl. No.: 17/257,235

(22) PCT Filed: Jul. 2, 2019

(86) PCT No.: PCT/JP2019/026388
§ 371 (c)(1),
(2) Date: Dec. 30, 2020

(87) PCT Pub. No.: WO2020/009129
PCT Pub. Date: Jan. 9, 2020

(65) Prior Publication Data
US 2021/0258295 A1    Aug. 19, 2021

(30) Foreign Application Priority Data
Jul. 3, 2018 (JP) .............................. JP2018-127031

(51) Int. Cl.
*H04L 9/40* (2022.01)
*H04W 12/041* (2021.01)
(Continued)

(52) U.S. Cl.
CPC ............ *H04L 63/08* (2013.01); *H04L 9/0861* (2013.01); *H04L 9/3247* (2013.01);
(Continued)

(58) Field of Classification Search
CPC ..... H04L 63/08; H04L 9/0861; H04L 9/3247; H04W 12/041; H04W 12/06
(Continued)

(56) References Cited

U.S. PATENT DOCUMENTS 8,688,072 B1 * 4/2014 Agarwal ............... H04W 12/06
455/410
10,194,320 B1 * 1/2019 Egner ................... H04W 12/61
(Continued)

FOREIGN PATENT DOCUMENTS

| CN | 107104932 | 8/2017 |
| JP | 2018-82353 | 5/2018 |

(Continued)

OTHER PUBLICATIONS

International Search Report issued in the corresponding PCT/JP2019/026388 filed Jul. 2, 2019.
(Continued)

*Primary Examiner* — Dant B Shaifer Harriman
(74) *Attorney, Agent, or Firm* — Cozen O'Connor (57) ABSTRACT

Facilitate configuration of authentication information for a service provided over IP network when there is no shared authentication information between IoT device and service provider device for a service used by IoT device, an intermediary device capable of authenticating legitimate access mediates between devices. An example: a cipher key CK stored in intermediary device and IoT device, as a result of SIM authentication of the SIM of the IoT device, is used as master key for services used by IoT device. By generating unique application key for a service used by IoT device on the intermediary device and IoT device on the basis of master key, and sending it to service provider apparatus from intermediary device by secure connection, common keys are set as authentication information to IoT device and service
(Continued)

provider apparatus. A SIM authentication process for generating cipher key can suppress SQN attack based on a bad request.

20 Claims, 4 Drawing Sheets

(51) Int. Cl.
*H04L 9/08* (2006.01)
*H04L 9/32* (2006.01)
*H04W 12/06* (2021.01)
*G16Y 30/10* (2020.01)

(52) U.S. Cl.
CPC ......... *H04W 12/041* (2021.01); *H04W 12/06* (2013.01); *G16Y 30/10* (2020.01)

(58) Field of Classification Search
USPC .............................................................. 726/7
See application file for complete search history.

(56) References Cited

U.S. PATENT DOCUMENTS

| | | | | |
|---|---|---|---|---|
| 2014/0289413 | A1* | 9/2014 | Chan | H04W 12/06 709/226 |
| 2015/0270971 | A1* | 9/2015 | Dietrich | G06F 21/35 713/168 |
| 2016/0092858 | A1* | 3/2016 | Giles | G06Q 20/3227 705/14.1 |
| 2016/0277930 | A1* | 9/2016 | Li | H04L 63/0838 |
| 2016/0366111 | A1* | 12/2016 | Smith | H04L 63/102 |
| 2017/0221055 | A1* | 8/2017 | Carlsson | G06Q 20/12 |
| 2018/0241571 | A1* | 8/2018 | Lu | H04L 9/0894 |
| 2019/0026450 | A1* | 1/2019 | Egner | G06F 21/44 |
| 2019/0253254 | A1* | 8/2019 | Brownlee | H04L 9/0618 |
| 2021/0258295 | A1* | 8/2021 | Katayama | H04W 12/041 |

FOREIGN PATENT DOCUMENTS

| | | |
|---|---|---|
| WO | WO 2010/128348 | 11/2010 |
| WO | WO 2016/024893 | 2/2016 |
| WO | WO 2017/130292 | 8/2017 |

OTHER PUBLICATIONS

Written Opinion issued in the corresponding PCT/JP2019/026388 filed Jul. 2, 2019.

"3rd Generation Partnership Project; Technical Specification Group Services and System Aspects; Study on Security aspects of integration of Single Sign-On (SSO) frameworks with 3GPP operator-controlled resources and mechanisms, (Release 13)", 3GPP, S3-142631_,TR33895_RM, 3rd Generation Partnership Project (3GPP), France, Dec. 19, 2014, pp. 1-35.

* cited by examiner

DEVICE AND METHOD FOR MEDIATING CONFIGURATION OF AUTHENTICATION INFORMATION

RELATED APPLICATIONS

This is a U.S. National Phase Application under 35 USC 371 of International Application PCT/JP2019/026388 filed on Jul. 2, 2019.

This application claims the priority of Japanese application no. 2018-127031 filed Jul. 3, 2018, the entire content of which is hereby incorporated by reference.

FIELD OF THE INVENTION

The present invention relates to an apparatus and method for mediating configuration of authentication information, and more particularly, to an apparatus and method for mediating configuration of authentication information for a service provided over an IP network.

BACKGROUND OF THE INVENTION

With the development of sensing and communication technologies, more and more devices are connected to computer networks, and the concept of the Internet of Things, in which all things are networked, is becoming popular. In the following, devices that can be directly or indirectly connected to an IP network, not limited to the Internet, are referred to as "IoT devices."

Services for IoT devices are being researched and developed on a daily basis, but in order to use these services, it is necessary to securely embed the authentication information specific to each service in each IoT device in a way that cannot be stolen from the outside.

SUMMARY OF THE INVENTION

However, the realization of secure embedding of authentication information is not easy because it complicates the design and manufacturing process of IoT devices and increases their cost. In a situation where the number of things connected to the Internet is the to reach 20 billion or even 100 billion by 2020, the cost will also increase exponentially as the number of devices increases exponentially.

The first objective of the present invention is to provide an apparatus, a method, and a program for the same for facilitating configuration of authentication information for a service provided over an IP network.

The second objective of the present invention is to provide a SIM authentication process that can be used in the above apparatus, method and program for the same.

In order to achieve such an objective, a first aspect of the present invention is an intervening apparatus which is part of a system comprising a service provider apparatus that provides a service over an IP network, an IoT device that uses the service, and the intervening apparatus that mediates configuration of authentication information for a connection between the IoT device and the service provider apparatus, configured to: receive initial configuration information including a key Id and a signature calculated based on a first key, wherein the first key is a cipher key or a key corresponding to the cipher key generated during an authentication process of a SIM of the IoT device and stored in the IoT device and the intervening apparatus together with the key Id, verifies the signature based on the first key that can be obtained by the key Id, calculates a second key based on the first key and a nonce, and transmits the second key to the service provider apparatus as the authentication information.

The second aspect of the present invention is the apparatus according to the first aspect, wherein the initial configuration information is received from the service provider apparatus that has received an initial configuration request including the initial configuration information from the IoT device.

The third aspect of the present invention is the apparatus according to the first or second aspect, wherein the service provider apparatus has a credential for a connection with the intervening apparatus.

The fourth aspect of the present invention is the apparatus according to the third aspect, wherein authentication of the service provider apparatus using the credential is performed before transmitting the second key.

The fifth aspect of the present invention is the apparatus according to any of the first to fourth aspects, wherein the nonce is generated by the intervening apparatus.

The sixth aspect of the present invention is the apparatus according to any of the first to fifth aspects, wherein the intervening apparatus exists in a core network of a cellular network that can be connected using the SIM.

The seventh aspect of the invention is the apparatus according to the sixth aspect, wherein the intervening apparatus has the same secret information as the secret information stored in the SIM, and the cipher key is calculated based on the secret information during the authentication process of the SIM.

The eighth aspect of the present invention is the apparatus according to any one of the first to seventh aspects, wherein resynchronization of SQN stored in the SIM and the intervening apparatus, based on the AUTS generated by the SIM, is performed during the authentication process of the SIM.

The ninth aspect of the present invention is a method at an intervening apparatus which is part of a system comprising a service provider apparatus that provides a service on an IP network, an IoT device that uses the service, and the intervening apparatus that mediates configuration of authentication information for a connection between the IoT device and the service provider apparatus, comprising steps of: receiving initial configuration information including a key Id and a signature calculated based on a first key, wherein the first key is a cipher key or a key corresponding to the cipher key generated during an authentication process of a SIM of the IoT device and stored in the IoT device and the intervening apparatus together with the key Id, verifying the signature based on the first key that can be obtained by the key Id, calculating a second key based on the first key and a nonce, and transmitting the second key to the service provider apparatus as the authentication information.

A tenth aspect of the present invention is a program for causing a computer to execute a method at an intervening apparatus which is part of a system comprising a service provider apparatus that provides a service over an IP network, an IoT device that uses the service, and the intervening apparatus that mediates configuration of authentication information for a connection between the IoT device and the service provider apparatus, wherein the method comprising steps of: receiving initial configuration information including a key Id and a signature calculated based on a first key, wherein the first key is a cipher key or a key corresponding to the cipher key generated during authentication process of a SIM of the IoT device and stored in the IoT device and the intervening apparatus together with the key Id, verifying the signature based on the first key that can be obtained with the key Id, calculating a second key based on the first key and a nonce, and transmitting the second key to the service provider apparatus as the authentication information.

According to one aspect of the invention, by applying the authentication process of the SIM of the IoT device, even if the IoT device is not sharing the authentication information with the service provider apparatus when it leaves the factory for example, it is made easy to do so ex-post facto.

DETAILED DESCRIPTION OF THE DRAWINGS

In the following, the embodiments of the present invention are explained in detail with reference to the drawings.

First Embodiment

Figure 1:
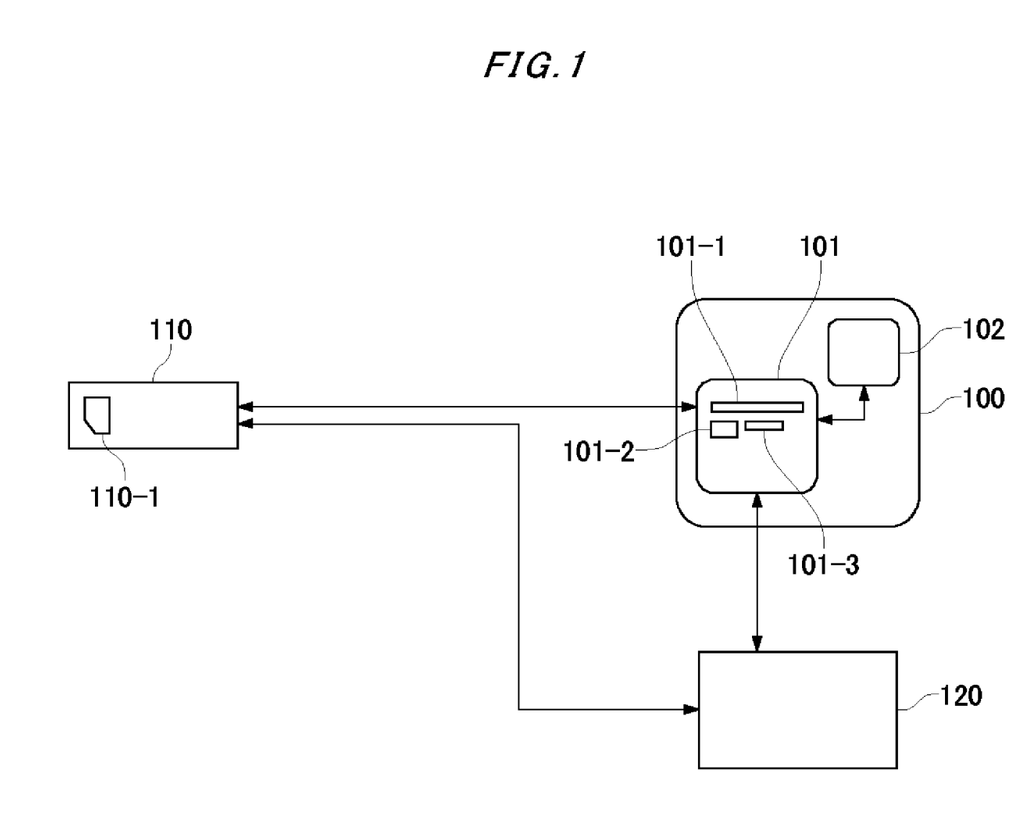
FIG. 1 shows an apparatus that mediates configuration of authentication information for a service provided over an IP network.

FIG. 1 shows an apparatus for mediating configuration of authentication information for a service provided over an IP network according to the first embodiment of the present invention. The apparatus 100 is capable of communicating with the IoT device 110 over a computer network, not limited to a cellular network and including an IP network, and is also capable of communicating over an IP network with a service provider apparatus 120 that provides a service used by the IoT device 110. The overall picture is a system comprising a service provider apparatus 120 that provides a service on an IP network, an IoT device 110 that uses the service, and an apparatus 100 that mediates configuration of authentication information for a connection between the IoT device 110 and the service provider apparatus 120.

The IoT device 110 has a SIM 110-1 for connecting to a cellular network, and the SIM 110-1 stores an identification number, such as IMSI, and secret information, such as a K-value. In this embodiment, the SIM 110-1 is provided by the operator of the apparatus 100 or its affiliate, and its identification number and secret information are also stored in the apparatus 100 or in a storage medium or storage apparatus accessible by the apparatus 100. The apparatus 100 verifies the credibility of the IoT device 110 through a SIM authentication process using the identification number and secret information. SIM authentication can be performed in the same way as the conventional process based on the MILENAGE algorithm, etc. using HLR/HSS, but with some features specific to the present invention. This point will be discussed later in the second embodiment.

The service provider apparatus 120 also has a credential for communication with the apparatus 100 based on the trust that the operator of the apparatus 100 has somehow formed in the service provider. Here, a "credential" is a generic term for a piece of information used for authentication, including IDs and passwords. While service providers can securely share credentials with the operator of the apparatus 100 using known methods, when sharing with IoT devices 110 is considered, there are risks of leakage during manufacturing of each of IoT devices 110, and in order to minimize the risk the cost will inevitably increase.

In a situation where there is no shared authentication information between the IoT device 110 and the service provider apparatus 120, the present invention easily enables remote configuration of authentication information by having the apparatus 100, which is capable of authentication for legitimate access with both sides, act as an intermediary apparatus, thereby accelerating the practical spread of IoT systems.

In more detail, in this embodiment, the cipher key (CK) or the key corresponding to the cipher key stored in the apparatus 100 and the IoT device 110 as a result of SIM authentication is used as the master key (parent key) for the IoT device 110 to use various services. By generating an application key (key with a specific use) specific to the service used by the IoT device 110 based on the master key in the apparatus 100 and the IoT device 110, and transmitting the application key from the apparatus 100 to the service provider apparatus 120 through a secure connection, a common key can be configured as authentication information for the IoT device 110 and the service provider apparatus 120.

In this embodiment, the cipher key CK will be used as an example, but it is also conceivable that the integrity key (IK) or the key corresponding to the integrity key stored in the apparatus 100 and the IoT device 110 as a result of SIM authentication may be used as the master key. In the present Specification, an integrity key can be understood as an example of a key corresponding to a cipher key.

The apparatus 100 exists within the core network of a cellular network. It can be a communication apparatus of an MNO (Mobile Network Operator), or it can be a communication apparatus of an MVNO (Mobile virtual Network Operator) which provides a wireless communication service by connecting to an MNO's communication infrastructure. The SIM 110-1 can be a SIM card provided by an MNO or MVNO.

Between an MNO and an MVNO, there may be an intervening MVNE (Virtual Mobile Network Operator) that provides support services for the smooth operation of the MVNO, and the MVNE may have a communication infrastructure that connects to the MNO's communication infrastructure to provide a wireless communication service. In this case, the apparatus 100 can be a communication apparatus of the MVNE and the SIM 110-1 can be a SIM card provided by the MVNE.

All or part of the apparatus 100 may be an instance on a cloud or on a public or private cloud. Herein, the term "cloud" refers to a system that can dynamically provision and provide computing resources such as a CPU, a memory, a storage, and a network bandwidth on demand over a network. For example, a cloud is available from AWS, etc. The term "public cloud" refers to a cloud that can be used by multiple tenants.

The SIM 110-1 of the IoT device 110 can be a physical SIM card, but it can also be a semiconductor chip embedded in the IoT device 110 (also referred to as an "eSIM"). Also, a software can be installed in a secure area within a module of the IoT device 110 to store an identification number and secret information in the software. Various aspects for the IoT device 110 to maintain values and programs necessary for SIM authentication can be considered.

Figure 2:
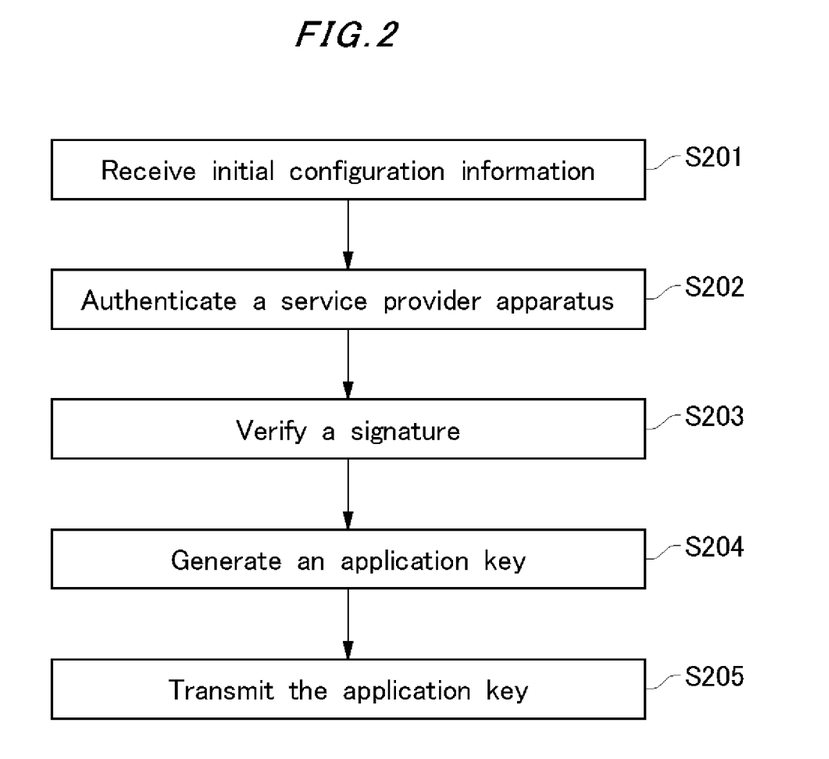
FIG. 2 shows an overview of a method of mediating configuration of authentication information according to the first embodiment of the present invention.

FIG. 2 shows an overview of the method for mediating configuration of authentication information according to the present embodiment. First, the IoT device 110 transmits a bootstrap request (initial configuration request) to the service provider apparatus 120 (not shown). The initial configuration to be performed includes configuration on the IoT device 110 and the service provider apparatus 120 of the application key for using a service, and may further include configuration of the connection information required for the IoT device 110 to establish a connection when using the service.

The bootstrap request can be transmitted by installing a bootstrap agent as a piece of software or a program for that purpose on the IoT device 110 so that the agent is activated when the IoT device 110 is turned on for the first time, or as described below it can be transmitted in response to the expiration of the authentication information.

The destinations of the initial configuration requests may be, for example, stored within respective pieces of client software which are installed on the IoT device 110 for services available on the IoT device 110, or a list of one or more destinations of the initial configuration requests for services available on the IoT device 110 may be stored, or they may be specified directly or indirectly by an administrator of the IoT device 110 from a console for a user of the intervening apparatus 100. Although the bootstrap agent and the client software do not necessarily have to be separate programs, in this embodiment, the bootstrap agent can obtain the destinations of the initial configuration requests.

The initial configuration request includes a key Id for specifying the master key (also referred to as the "first key") as a part of initial configuration information and a signature based on the master key and a timestamp, which is added as necessary, is added. When a timestamp is used in the generation of the signature, the timestamp is also included in the initialization information. As it will also be discussed later, in the SIM authentication process, when the generated master key is stored in the apparatus 100 and the IoT device 110, the key Id can also be generated to store them in an associated manner.

Next, the apparatus 100 receives the initial configuration information from the service provider apparatus 120 (S201). The apparatus 100 authenticates the service provider apparatus 120 that has transmitted the initial configuration information (S202), and if the authentication result is positive, the apparatus 100 obtains a master key based on the key Id and verifies the signature (S203). The order of the authentication of the service provider apparatus 120 and the verification of the signature may be reversed.

The apparatus 100 then generates a nonce and calculates an application key (also referred to as a "second key") based on the master key and the nonce. (S204). The application key and the nonce are then transmitted to the service provider apparatus 120 (S205). The IoT device 110 can receive the nonce from the service provider apparatus 120 and use it to calculate the application key using the same algorithm as the apparatus 100, as explained further below, so that the IoT device 110 and the service provider apparatus 120 can configure a common key together as authentication information.

Here, although nonce generation is performed on the apparatus 100, it is possible to perform it on the service provider apparatus 120 or the IoT device 110, and perform necessary transmissions and receptions. If the nonce generation is performed on the service provider apparatus 120 or the IoT device 110, the management by the intervening apparatus 100 may not always be sufficient, and there is a possibility that simple nonce may be generated. In such a case, although it is desirable to generate different application keys for different services, they may end up being identical, or an attacker may be able to guess the logic of the nonce generation.

The intervening apparatus 100 comprises a communication unit 101-1 such as a communication interface, a processing unit 101-2 such as a processor or CPU, and a storage unit 101-3 including a storage apparatus or storage medium such as a memory and a hard disk. The intervening apparatus 100 can realized each of the processes explained below by executing a program, on the processing unit 101-2, for performing each of the processes described above and below that is stored in the storage unit 101-3 or in a storage apparatus or medium accessible from the intervening apparatus 100. As shown in FIG. 1, the intervening apparatus 100 can be separated into a first apparatus 101 and a second apparatus 102 depending on the processing contents, but these can be made into a single apparatus or further separated. The other devices can be realized by similar hardware. The program to be executed by each apparatus may include one or more programs, and may be stored on a computer-readable storage medium to form a non-transitory program product.

Figure 3:
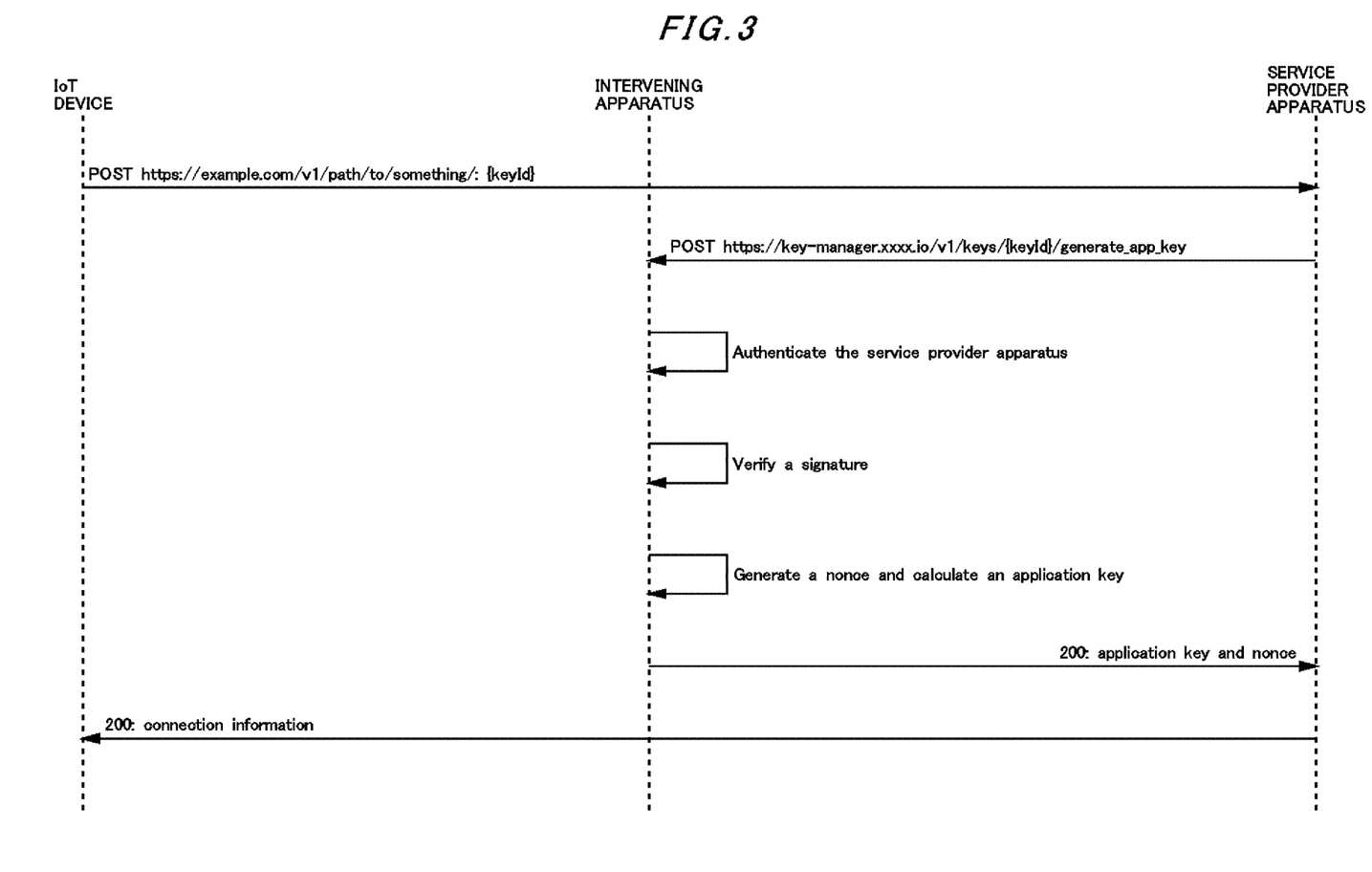
FIG. 3 shows an example of a method of mediating configuration of authentication information according to the first embodiment of the present invention.

FIG. 3 shows a specific example of the method of mediating configuration of authentication information according to the present embodiment. First, the IoT device 110 transmits initial configuration information such as a key Id to the destination of the service provider apparatus 120 specified by "example.com/v1/path/to/something/" to make an initial configuration request. Although parameters such as {keyId} are shown in FIG. 3, not all parameters to be sent and received are illustrated.

The service provider apparatus 120 makes a request to the apparatus 100 for the generation of an application key based on the initial configuration information received. At the apparatus 100, in a variable order, verification of the signature included in the initial configuration information, authentication of the service provider apparatus 120, and, if necessary, confirmation of whether an access authority to the specified key Id is given to the service provider apparatus 120 are performed. The apparatus 100 can provide credentials to respective service providers. It can also configure a master key or its Id for which respective service providers can provide services as an access authority. In more detail, it is possible to specify services or service providers that can access the master key or its key Id generated as a result of authentication in a SIM authentication request in which the AUTS described in the second embodiment is specified.

The signature can be, for example, a hash value or digest value of the concatenated value of the master key and a timestamp added as necessary, and the same calculation can be performed on the apparatus 100 to verify the signature by match or mismatch of the hash values or digest values. SHA-256 can be cited as an example of a hash function for obtaining hash values.

The apparatus 100 then generates a nonce required to calculate the application key. The nonce can be a sequence of numbers generated from random numbers or pseudo-random numbers, such as [23, 130, 4, 247, . . . ]. The calculation of the application key is then performed using the generated nonce and the master key that can be obtained by the received key Id. As a specific example, it can be a hash value of the concatenated value of these values. The application key is transmitted to the service provider apparatus 120 in a secure communication channel between the apparatus 100 and the service provider apparatus 120.

The service provider apparatus 120 configures the received application key as authentication information and transmits connection information needed for the IoT device 110 to use the service to the IoT device 110. The IoT device 110 which received the information makes the required configuration. The connection information can include destination information, and the URL or the IP address of the destination are examples. In addition, the service provider apparatus 120 also performs necessary configuration, if any, in addition to the configuration of the application key. In this embodiment, the connection information includes the above-mentioned nonce. The IoT device 110 uses the received nonce to calculate for itself an application key that is identical to the application key set on the service provider apparatus 120.

As an example, if client software for the service to be used is installed on the IoT device 110, the connection information for the service may be read by the software so that the IoT device 110 can automatically use the service. In this case, the software is capable of communication using an application key.

The IoT device 110 can be any device that has necessary communication functions and is capable of performing SIM authentication and initial configuration. For that end, it is required to be capable of running software in a programming language such as C or Java (registered trademark). Extension to different programming languages (Ruby, Go, Javascript (registered trademark), etc.) by means of wrapping the implementation in C is also possible. For example, the IoT device 110 can be a device on which an OS, such as Linux (registered trademark) or Android (registered trademark), is installed.

It is to be noted that if the term "only" is not written, such as in "based only on x", "in response to x only", or "in the case of x only", in the present specification, it is assumed that additional information may also be taken into account.

In addition, as a caveat, even if there are characteristics of a method, a program, a terminal, an apparatus, a server or a system (hereinafter referred to as "method, etc.") that perform operations different from those described herein, each aspect of the invention is intended to perform the same operation as one of the operations described herein, and the existence of an operation different from those described herein does not mean that the method, etc. is outside the scope of each aspect of the invention.

Second Embodiment

The SIM authentication of the SIM of the IoT device 110 by the intervening apparatus 100 described in the first embodiment can be performed in the same way as the conventional process using HLR/HSS, but with the improvements described below.

As shown in FIG. 1, the intervening apparatus 100 can be divided into the first apparatus 101 and the second apparatus 102 depending on the processing contents. In this embodiment, the second apparatus 102 is mainly responsible for generating the parameters required in SIM authentication. This corresponds at least partially to the function of an AuC of a communication carrier.

The second apparatus 102 stores the identification number, such as IMSI stored in the SIM 110-1, and secret information, such as K-value, and also stores an SQN that is synchronized between the SIM 110-1 and the second apparatus 102. The SQN is usually incremented synchronously in the SIM and in the AuC with a SIM authentication request specifying an identification number such as an IMSI.

Since the generation of the cipher key CK referred to in the first embodiment can be performed by communication between the IoT device 110 and the intervening apparatus 100 or the second apparatus 102 via a computer network that is not necessarily limited to a cellular network, there may be a situation where the SQN managed by the second apparatus 102 is incremented by a bad request from a device without a legitimate SIM that has somehow obtained the identification number such as the IMSI. Therefore, there may be a situation in which the SQN managed by the second apparatus 102 is incremented by an unauthorized request from a device without a SIM that somehow obtains an identification number such as an IMSI, etc., and the SQN may deviate from the SQN of the IoT device 110. This embodiment suppresses this type of attacks on SQNs by bad requests.

Figure 4:
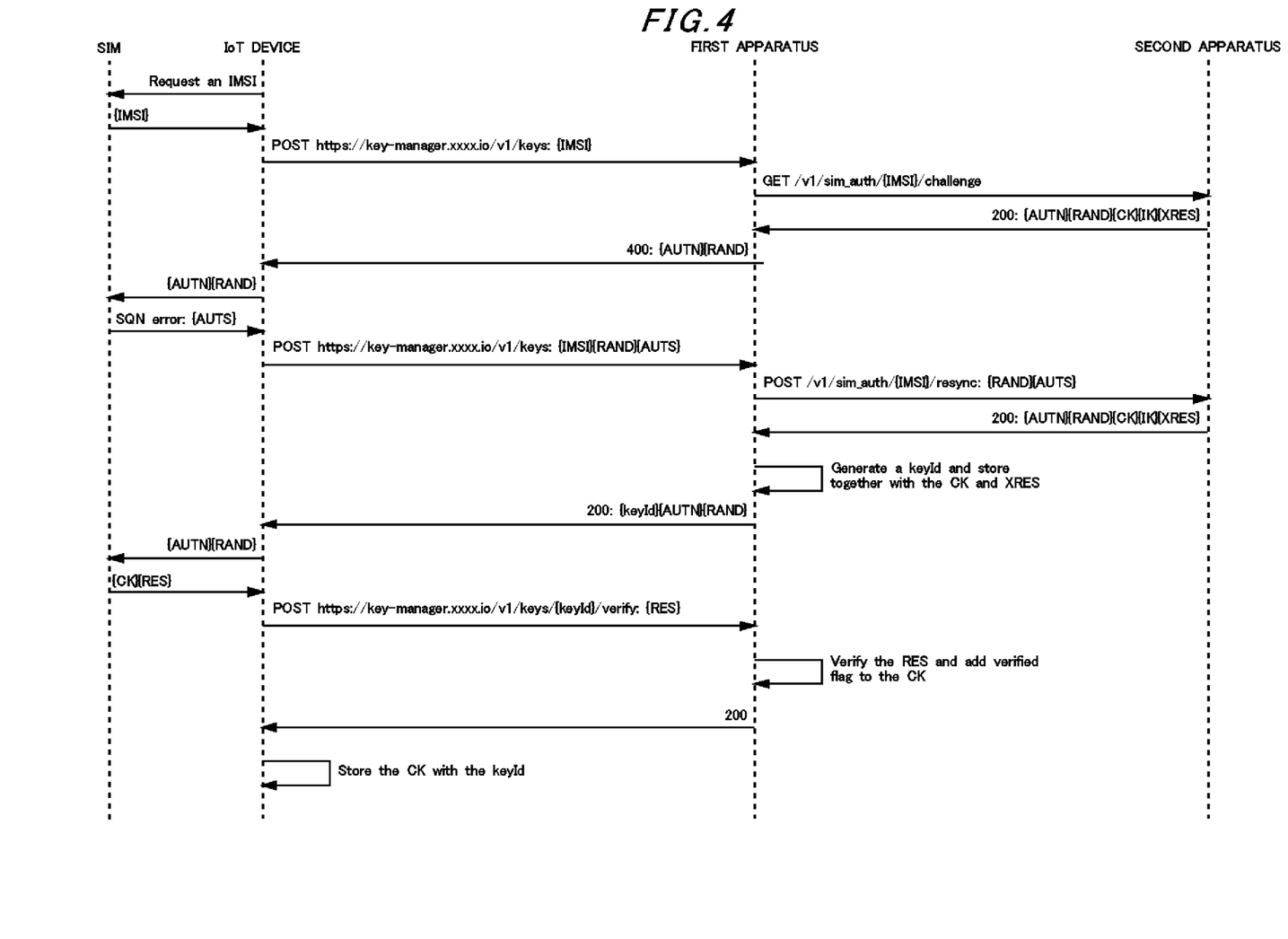
FIG. 4 illustrates the SIM authentication process according to the second embodiment of the present invention.

In FIG. 4, the IoT device 110 and the SIM 110-1 that the IoT device 110 has are shown as separate elements. The purpose of this is to distinguish processes performed by executing a program on the IoT device 110 from processes performed inside the SIM 110-1 in response to the access from the IoT device 110 to the SIM 110-1 as being different in nature. It is added that both processes can be understood as processes performed on the IoT device 110. When the IoT device 110 is used as the subject, it can be understood to refer to the program for SIM authentication running on the IoT device 110. In addition, in FIG. 4, the second apparatus 102 is shown separately from the first apparatus 101, However, it should be noted that this can also be regarded as processes performed on the intervening apparatus 100. It should also be noted that FIG. 4 does not illustrate all the parameters that are transmitted and received, although FIG. 4 will be used as a reference in the following.

First, IoT device 110 requests an IMSI to the SIM 110-1. The SIM 110-1 returns the value of the IMSI to the IoT device 110. The IoT device 110 which received the IMSI requests SIM authentication to the first apparatus 101. The first apparatus 101 requests the second apparatus 102 to generate an authentication vector including an AUTN, a RAND, a CK, an IK, and an XRES.

This authentication vector generation request sets an SQN to an invalid value in order to suppress the bad request described above, so that the AUTN determined based on the SQN is a value that causes SIM authentication to fail. If the value of the SQN is set to 0, when SIM authentication is performed even once for the SIM 110-1, then the SQNs will not match. In addition, instead of specifying an invalid value for the SQN at the first apparatus 101, the value may be specified at the second apparatus 102. More specifically, the value may be set so that it is below the correct SQN stored at the second apparatus 102. Also, in light of its purpose in this embodiment, only the AUTN, RAND, etc. required for subsequent processes may be generated and returned to the first apparatus 101, without generating the entire authentication vector.

After receiving the authentication vector from the second apparatus 102, the first apparatus 101 transmits the AUTN and the RAND to the IoT device 110, and the IoT device 110 passes the AUTN and the RAND to the SIM 110-1 to request key calculation. As an error handling process since the SQNs do not match, the SIM 110-1 generates an AUTS required for a Resync request to synchronize SQNs and provides it to the IoT device 110. the IoT device 110 specifies the IMSI, the RAND and the AUTS and requests SIM authentication again to the first apparatus 101. Here, the AUTS is a parameter that cannot be calculated if the secret information stored in the SIM 110-1 is not known.

The first apparatus 101 makes a Resync request for resynchronization to the second apparatus 102 in response to the AUTS and RAND being specified. The second apparatus 102 generates an authentication vector by specifying the SQN of the SIM 110-1 included in the AUTS in a masked manner and returns it to the first apparatus 101. The first apparatus 101 generates a key Id to identify the received cipher key CK, and stores them in association with each other. It also stores the XRES in association with them.

The first apparatus 101 sends the key Id, the AUTN and the RAND to the IoT device 110, and the IoT device 110 requests the SIM 110-1 to make a key calculation using the AUTN and the RAND. In addition to the AUTN and the RAND received, the SIM 110-1 calculates a CK and an RES using the secret information K stored in its own storage medium or apparatus, and passes them to the IoT device 110.

The IoT device 110 sends the key Id and RES to the first apparatus 101 and requests the verification of the generated CK. The first apparatus 101 performs the verification by obtaining an XRES based on the key Id and comparing it with the received RES, and if there is a match, it flags the CK identified by the key Id as verified. Then, the first apparatus 101 transmits a success response of the SIM authentication to the IoT device 110 with the expiration date of the CK if necessary, and the IoT device 110 stores the CK in association with the key Id. In this case, the CK may be stored in association with the IMSI as well.

This embodiment enables the application of the CK or a key corresponding to the CK as a master key for the IoT device 110 to use various services in the subsequent processes, so that the application of a key agreed upon by SIM authentication is made possible without frequent SIM authentication requests.

In addition, in order to deter bad SIM authentication requests from a device without a legitimate SIM, the SIM authentication process according to the present embodiment intentionally fails SQN synchronization, which is a prerequisite for key calculation, and triggers Resync, which requires secret information that can only be accessed by a legitimate SIM. Then, the above-mentioned bad attacks can be disabled by making the success of Resync as a condition for the execution of subsequent processes.

REFERENCE SIGNS LIST 100 intervening apparatus
101 first apparatus
101-1 communication unit
101-2 processor unit
101-3 storage unit
102 second apparatus
110 IoT device
110-1 SIM
120 service provider apparatus The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An intervening apparatus communicative with a service provider apparatus that provides a service over an Internet Protocol (IP) network, an Internet of things (IoT) device that uses the service, the intervening apparatus comprising:
a communication interface, at least one processor, and storage medium operative to, the at least one processor operative to read program instructions that, when executed by the at least one processor, cause the at least one processor to mediate configuration of authentication information for a connection between the IoT device and the service provider apparatus, including to perform operations that:
receive initial configuration information including a key Id and a signature calculated based on a first key, wherein the first key is either a cipher key or a key corresponding to the cipher key, the first key generated as a result of an authentication process of a SIM of the IoT device and stored in the IoT device and in the intervening apparatus together with the key Id,
verify the signature based on the first key that can be obtained by the key Id,
calculate a second key based on the first key and a nonce, and
transmit, to the service provider apparatus, the second key as the authentication information.

2. The intervening apparatus according to claim 1, wherein the initial configuration information is received from the service provider apparatus that has received an initial configuration request including the initial configuration information from the IoT device.

3. The intervening apparatus according to claim 1, wherein the service provider apparatus has a credential for a connection with the intervening apparatus.

4. The intervening apparatus according to claim 3, wherein authentication of the service provider apparatus using the credential is performed before transmitting the second key.

5. The intervening apparatus according to claim 1, wherein the nonce is generated by the intervening apparatus.

6. The intervening apparatus according to claim 1, wherein the intervening apparatus exists in a core network of a cellular network that can be connected using the SIM.

7. The intervening apparatus according to claim 6, wherein the intervening apparatus has the same secret information as the secret information stored in the SIM, and the cipher key is calculated based on the secret information during the authentication process of the SIM.

8. The intervening apparatus according to claim 1, wherein resynchronization of SQNs stored in the SIM and the intervening apparatus, based on the AUTS generated by the SIM, is performed during the authentication process of the SIM.

9. An automated method performed by an intervening apparatus which is part of a system comprising a service provider apparatus that provides a service on an Internet Protocol (IP) network, an Internet of things (IoT) device that uses the service, and the intervening apparatus, the method comprising:
mediating configuration of authentication information to facilitate a connection between the IoT device and the service provider apparatus, including:
receiving initial configuration information including a key Id and a signature calculated based on a first key, wherein the first key is either a cipher key or a key corresponding to the cipher key, the first key generated as a result of an authentication process of a SIM of the IoT device and stored in the IoT device and in the intervening apparatus together with the key Id,
verifying the signature based on the first key that can be obtained by the key Id,
calculating a second key based on the first key and a nonce, and
transmitting, to the service provider apparatus, the second key as the authentication information.

10. At least one non-transitory computer readable medium including instructions that, when executed, cause an intervening apparatus, which is part of a system comprising a service provider apparatus that provides a service over an Internet Protocol (IP) network, an Internet of things (IoT) device that uses the service, and the intervening apparatus that mediates configuration of authentication information for a connection between the IoT device and the service provider apparatus, to perform operations including:

receiving initial configuration information including a key Id and a signature calculated based on a first key, wherein the first key is either a cipher key or a key corresponding to the cipher key, the first key generated as a result of an authentication process of a SIM of the IoT device and stored in the IoT device and in the intervening apparatus together with the key Id, verifying the signature based on the first key that can be obtained by the key Id, calculating a second key based on the first key and a nonce, and transmitting, to the service provider apparatus, the second key as the authentication information.

11. The automated method according to claim 9, further comprising:

receiving the initial configuration information from the service provider apparatus that has received an initial configuration request including the initial configuration information from the IoT device.

12. The automated method according to claim 9, wherein the service provider apparatus has a credential for a connection with the intervening apparatus.

13. The automated method according to claim 12, wherein authentication of the service provider apparatus using the credential is performed before transmitting the second key.

14. The automated method according to claim 9, further comprising:

generating the nonce by the intervening apparatus.

15. The automated method according to claim 9, wherein the intervening apparatus exists in a core network of a cellular network that can be connected using the SIM.

16. The automated method according to claim 15, wherein the intervening apparatus has the same secret information as the secret information stored in the SIM, and the cipher key is calculated based on the secret information during the authentication process of the SIM.

17. The automated method according to claim 1, wherein resynchronization of SQNs stored in the SIM and the intervening apparatus, based on the AUTS generated by the SIM, is performed during the authentication process of the SIM.

18. The at least one non-transitory computer readable medium according to claim 9, wherein the instructions, when executed, cause the intervening apparatus to further perform operations including:

receiving the initial configuration information from the service provider apparatus that has received an initial configuration request including the initial configuration information from the IoT device.

19. The at least one non-transitory computer readable medium according to claim 15, wherein the intervening apparatus has the same secret information as the secret information stored in the SIM, and the cipher key is calculated based on the secret information during the authentication process of the SIM.

20. The at least one non-transitory computer readable medium according to claim 9, wherein in the operations, resynchronization of SQNs stored in the SIM and the intervening apparatus, based on the AUTS generated by the SIM, is performed during the authentication process of the SIM.

* * * * *